United States Patent [19]

Howeth

[11] Patent Number: 4,775,398
[45] Date of Patent: Oct. 4, 1988

[54] STRUCTURALLY IMPROVED FILTER HOUSING AND MOUNTING APPARATUS

[76] Inventor: D. Franklin Howeth, 233 Chuck Wagon Trail, Fort Worth, Tex. 76108

[21] Appl. No.: 8,938

[22] Filed: Jan. 30, 1987

[51] Int. Cl.[4] .............................................. B01D 46/04
[52] U.S. Cl. ...................................... 55/302; 55/378; 55/498; 55/341.1
[58] Field of Search ............... 55/302, 303, 341 R, 55/498, 378; 210/333.01, 323.2; 254/133 R, 98, 100

[56] References Cited

U.S. PATENT DOCUMENTS

| | | | |
|---|---|---|---|
| 564,422 | 7/1896 | Dehne et al. | 210/333.01 |
| 2,506,634 | 5/1950 | Fields | 254/98 |
| 3,064,818 | 11/1962 | Kasten | 55/481 |
| 3,630,005 | 12/1971 | Reinauer | 55/302 |
| 4,209,310 | 6/1980 | Berkhoel | 55/273 |
| 4,319,897 | 3/1982 | Labadie | 55/302 |
| 4,578,092 | 3/1986 | Klimczak et al. | 55/302 |

FOREIGN PATENT DOCUMENTS

| | | | |
|---|---|---|---|
| 1192501 | 8/1985 | Canada | 55/302 |
| 893649 | 2/1944 | France | 55/350 |
| 2943093 | 5/1981 | Fed. Rep. of Germany | 55/302 |
| 2063099 | 6/1981 | United Kingdom | 55/302 |

Primary Examiner—Bernard Nozick
Attorney, Agent, or Firm—Hubbard, Thurman, Turner & Tucker

[57] ABSTRACT

The vertical housing and the internal centerplate of a self-cleaning air filtration system are provided with significantly improved structural rigidity by means of a contaminant chamber partition system and an associated jack screw and gimbal plate filter mounting system. The mounting system is operative to place a plurality of cylindrical filter elements disposed within the housing in a state of axial compression between the centerplate and a series of support trusses secured to the internal partition system in a manner utilizing the mounted filters as internal structural bracing members.

25 Claims, 3 Drawing Sheets

STRUCTURALLY IMPROVED FILTER HOUSING AND MOUNTING APPARATUS

BACKGROUND OF THE INVENTION

The present invention relates generally to air filtration systems, and more particularly provides a self-cleaning, multi-filter air filtration system having structurally improved filter housing and mounting apparatus incorporated therein.

In the art of self-cleaning filter systems, numerous methods have been proposed for mounting cylindrical filter cartridges within the housing portion of the system, and for periodically cleaning such filters during the course of system operation.

In typical systems having filters mounted in the dust-laden air below the housing centerplate, filter mounting means that tend to minimize overall housing height are most desirable. This is conventionally accomplished by providing filter mounts which permit insertion of the various filters directly through the housing sidewalls into a contaminant chamber portion of the housing disposed beneath the centerplate. Such direct entry filter mounting technique is exemplified in U.S. Pat. No. 4,209,310 and U.S. Pat. No. 4,319,897. In the first patent, the filter is secured to the centerplate by means of a drawbar extending through the filter bore and threadingly engaging a retainer web positioned in the center plate opening located directly beneath a filter reverse flushing air valve. In the second patent, the filter incorporates a flange around the clean air flow bore exit, whereby the flanged end is clamped in sealing engagement to the housing centerplate and is aligned with a reverse flushing filter cleaning element.

A variety of problems have typically been encountered with direct entry filter mounting system of the type described. For example, in such conventional systems the entire weight of the suspended filter or filters is borne entirely by the centerplate. Typically, a filter element with 200 square feet of pleated filter media, in an un-cleaned condition, weighs approximately 30 pounds. In the twelve filter example of the second patent, the total filter weight supported by the housing centerplate could reach approximately 360 pounds. This static deflective load on the centerplate is in addition to the deflective load thereon created by internal pressures within the contaminant chamber portion of the housing caused by the flow of particulate-laden air therethrough.

In such conventional systems, particularly when the filters begin to clog with particulate matter, the housing static pressure may rise to the collapse or "burst" strength of the filters. This internal housing pressure may easily reach 5 psig. Accordingly, both the housing walls and the centerplate must typically be designed to withstand these internal pressure variances, and the centerplate, from which a series of relatively heavy filter elements are suspended, must be designed to withstand not only these pressure-induced deflective loads but the filter weight deflection load as well.

Another problem associated with conventional filter housing and mounting apparatus in which the filters are suspended from a large-area centerplate is that the filter elements, and various pieces of their associated suspension mounting hardware, can fall into the hopper section (typically disposed beneath the filter housing) during mounting or removal of the filter elements. Simply stated, if care is not exercised in handling the relatively heavy filter elements, they may easily slip from the installer's outstretched hands and fall, together with some or all of their mounting hardware, into the hopper section below. This, of course, can necessitate the partial disassembly of the filtration system to retrieve the dropped components.

It is accordingly an object of the present invention to provide stucturally improved filter housing and mounting apparatus which eliminates or substantially minimizes above-mentioned and other problems and limitations associated with conventional filter housing and mounting apparatus of the general type described.

SUMMARY OF THE INVENTION

In carrying out principles of the present invention, in accordance with a preferred embodiment thereof, a self-cleaning, multi-filter air filtration system is provided into which structurally improved filter housing and mounting apparatus is uniquely incorporated. The apparatus comprises a housing having a vertically extending sidewall section whose interior is divided by a transversely extending centerplate into a clean air discharge chamber disposed above the centerplate, and a contaminant chamber disposed beneath the centerplate and having an open lower end which communicates with the interior of a hopper section depending from the lower end of the housing.

Partition means, in the form of vertically extending interconnected partition panels, are disposed within the contaminant chamber and divide it into a series of rectangularly cross-sectioned, vertically extending contaminant subchambers having open lower ends, and upper ends defined by portions of the centerplate. Each of the contaminant subchambers extends along a vertical axis which transversely intersects the centerplate, and is accessible through one of the a pair of sidewall access doors provided on the housing.

The connected partition panels are secured at upper side edge portions thereof to the centerplate, and at horizontally outer side edge portions thereof to the housing sidewall section, to thereby form a structural bracing interconnection between the centerplate and the housing sidewall section. In this manner, the overall rigidity of both the centerplate and the portion of the sidewall section extending around the contaminant chamber is substantially increased. To further increase the rigidity of the housing, lower support trusses are provided which extend across the lower ends of the contaminant subchambers, are intersected by their vertical axes, and are intersecured between opposite sidewall and partition panel portions thereof.

A series of circular openings, each centered about one of the contaminant subchamber axes, are formed through the centerplate. Each of these openings has a vertically extending hollow clean air flow tube secured therein. Lower end portions of the tubes project downwardly into the contaminant subchambers, and upper end portions of the tubes project upwardly into the clean air discharge chamber which is provided with an outlet opening formed through the housing sidewall section.

The housing is also provided with filter mounting means for vertically supporting a series of hollow cylindrical filter elements within the contaminant subchambers. Such filter mounting means include the lower end portions of the clean air flow tubes, and further include a series of vertically disposed cylindrical jack screw members having threaded lower end portions screwed into threaded openings formed in the support trusses at their intersections with the subchamber axes, enlarged upper head end portions, and hand wheel portions operative to raise or lower the jack screw members within their associated contaminant subchambers. The head end portions of the jack screw members are received in hollow cylindrical socket portions of disc-shaped, horizontally oriented gimbal plates which have upwardly projecting filter alignment rings on their upper surfaces.

Each of the filters is vertically mounted in its contaminant subchamber by inserting the lower end portion of the subchamber's clean air flow tube into the upper end of the filter bore, and inserting the gimbal plate filter alignment ring into the lower end of the filter bore. The jack screw hand wheel is then turned to raise the jack screw and place the filter element in a state of axial compression between the gimbal plate and the centerplate. The upper and lower ends of each mounted filter are respectively sealed by an annular upper seal element which circumscribes the lower end portion of the clean air flow tube and is compressed between the centerplate and the upper end of the mounted filter, and a lower annular seal element which circumscribes the gimbal plate filter alignment ring and is compressed between the lower end of the mounted filter and the upper surface of the gimbal plate.

Vertically mounted in this manner within the contaminant subchambers, the cylindrical filter elements define structural bracing interconnections between the centerplate and the lower support trusses and thus uniquely function to further enhance the overall rigidity of the both the housing sidewall section and the centerplate. The filter mounting means also advantageously function to free the centerplate from the filter weight load conventionally imposed thereon, the entire weight of the mounted filters being borne instead by the lower support trusses.

In addition to supporting the weight of the mounted filters, and defining a portion of the filter mounting means, the lower support trusses also uniquely function to block a lateral portion of the lower ends of the contaminant subchamber to thereby preclude the passage of the filters downwardly through the open lower ends of the contaminant subchambers. Accordingly, during both the loading and unloading of the filter element into their associated contaminant subchambers, the possibility of dropping any of the filters into the hopper is positively precluded.

Moreover, the lower portion of the filter mounting means (i.e., the jack screw and the associated gimbal plate) provide a convenient base upon which to rest the lower filter end during installation or removal of the filters. This greatly facilitates the loading and unloading of the filters.

During operation of the filter system, particulate-laden air is forced upwardly through the hopper section via a suitable inlet pipe connected thereto. The particulate-laden air then vertically enters the contaminant subchambers past the support trusses at their lower ends, and is forced laterally inwardly through the mounted filters into their interiors to remove the particulate matter from the air stream. The substantially clean air within the filter bores is then forced upwardly into the clean air discharge chamber through the clean air flow tubes and is discharged through the outlet opening of the clean air discharge chamber.

To periodically backflush and clean the filter elements, a conventional high pressure air backflushing system is operatively disposed within the clean air discharge chamber and includes a series of air flushing heads each disposed above one of the clean air flow tubes. By opening appropriate flushing valve portions of the backflushing system, jets of high pressure air are forced downwardly through the clean air flow tubes into the filter bores and then laterally outwardly through the bodies of the filters. This backflushing air flow dislodges the caked-on particulate matter so that it can drop from the backflushed filters into the hopper section.

Due to the lack of filter mounting apparatus, such as connecting rods or the like, extending through the filter bores, the backflushing air flow through the mounted filters is substantially unimpeded, thereby increasing the effectiveness of the backflushing operation. In addition to dividing the contaminant chamber into the subchambers which house the individual filters, the partition panels also prevent cross-contamination between the filters during the backflushing operation. Specifically, the partition panels act as "barriers" to prevent the dislodged particulate matter from being backflushed from one filter from being transferred to the outer surface of an adjacent filter. Dislodged particulates backflushed from a given filter are simply driven against one or more of the intervening partition panels and caused to drop directly into the hopper section below.

While the unique filter housing and mounting apparatus of the present invention is particularly well suited to a vertically disposed housing having a series of individual filter elements mounted therein, the present invention is also applicable to a horizontally disposed housing, or a smaller housing having only one filter element mounted therein. Additionally, the structural advantages provided by the present invention may be incorporated in a positive pressure filtration system in which the particulate-laden air is forced through the filter housing, or in a negative pressure application in which such particulate-laden air is drawn through the housing.

DETAILED DESCRIPTION

Figure 1:
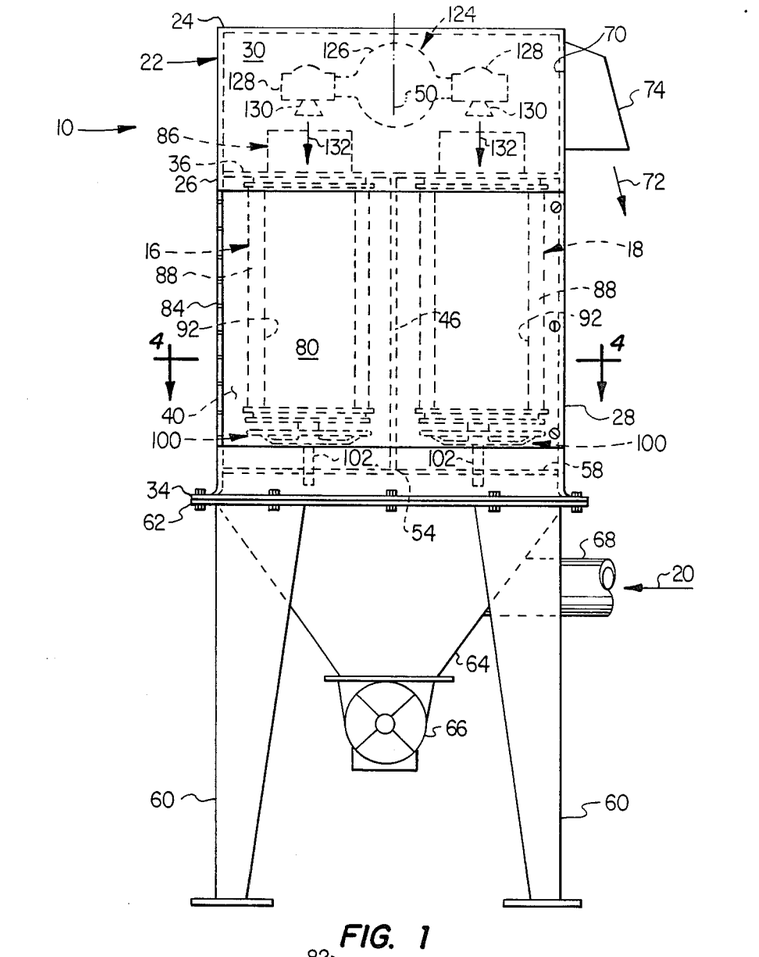
FIG. 1 is a front elevational view of a self-cleaning air filtration system which embodies principles of the present invention, certain of the interior system components being illustrated in phantom.
Figure 2:
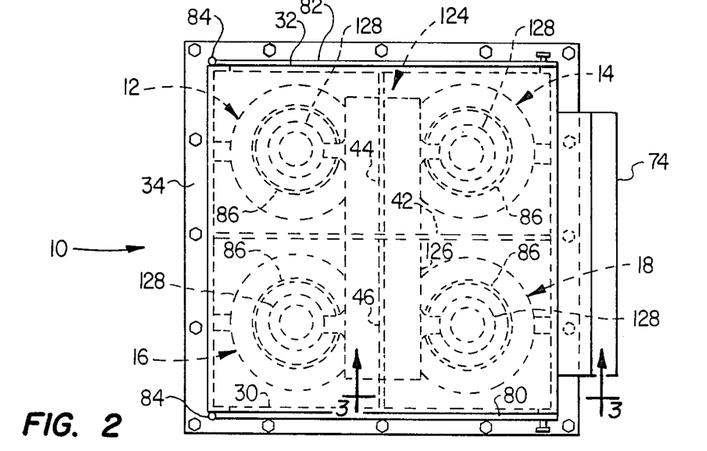
FIG. 2 is a top plan view of the air filtration system.

Illustrated in FIGS. 1 and 2 is a self-cleaning air filtration system which incorporates improved filter housing and mounting apparatus 10 that embodies principles of the present invention and is utilized in conjunction with a series of filters, such as the representatively depicted filters 12, 14, 16 and 18, to remove particulate matter from an inlet flow 20 of air or other gas.

The apparatus 10 includes a vertically disposed, hollow metal housing 20 having along its vertical length a generally square cross-section. Housing 22 has an upper end wall 24, a left sidewall 26, a right sidewall 28, a front sidewall 30, a rear sidewall 32, and an open lower end bordered by an external mounting flange 34.

Extending horizontally across the interior of the housing 22 is a transverse wall in the form of a metal centerplate 36 which is welded or otherwise suitably secured at its periphery to the housing sidewalls. Centerplate 36 divides the interior of the housing 22 into a clean air chamber 38 (FIG. 1) disposed between the centerplate and the upper housing endwall 24, and a contaminant chamber 40 disposed between the centerplate 36 and the mounting flange 34.

Positioned within the contaminant chamber 40 are partition means in the form of vertically disposed metal structural panels 42, 44 and 46 (FIG. 4) that are welded together at their juncture 48 which is aligned with the vertical axis 50 (FIG. 1) of the housing 22. The horizontally narrower panels 44 and 46 are horizontally aligned and are each perpendicular to the horizontally wider panel 42. As can best be seen in FIG. 4, these three structural panels function as partitions which divide the contaminant chamber 40 into vertically extending subchambers $40_a$, $40_b$, $40_c$ and $40_d$ which respectively receive the vertically oriented filter elements 12, 14, 16 and 18. The contaminant subchambers have identical, square cross-sectioned configurations, extend downwardly from the centerplate 36 and open downwardly through the lower end of the housing 22, and have vertical central axes 52. The upper edges of the structural panels 42, 44 and 46 are welded to the underside of the centerplate 36, while the horizontally facing outer edges of the panels are welded to sidewall portions of the housing 22. The lower panel edges 54 (FIG. 1) are positioned slightly above the housing flange 34. The panels 42, 44 and 46 not only divide the contaminant chamber into the separated subchambers $40_a$, $40_b$, $40_c$ and $40_d$, but also significantly enhance the structural rigidity of the housing 22 in a manner subsequently described.

Figure 3:
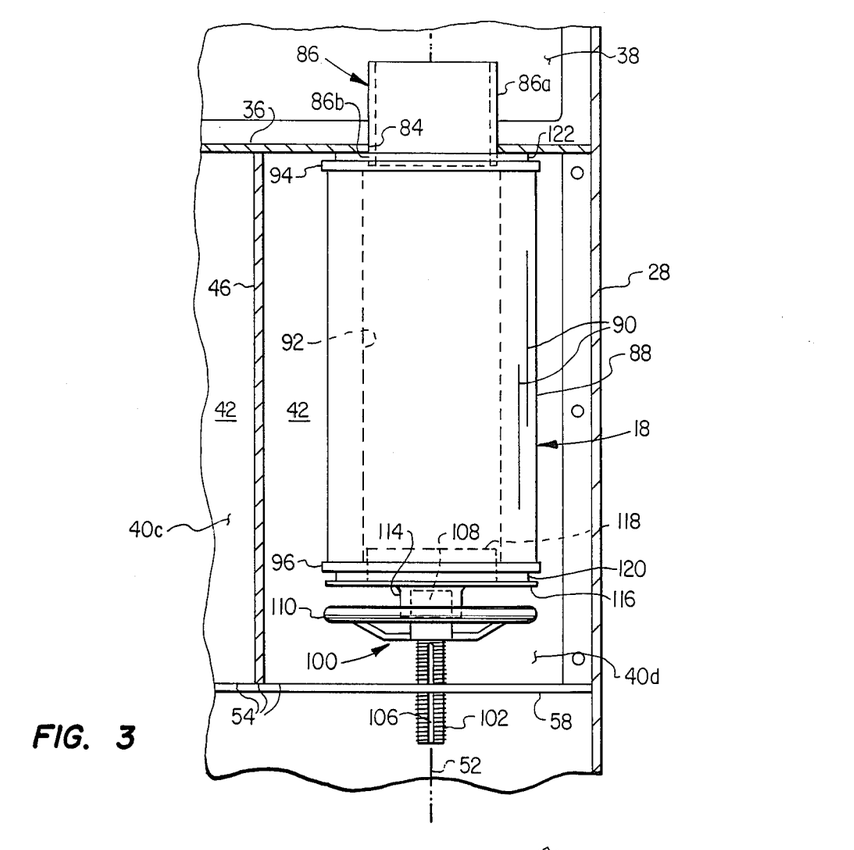
FIG. 3 is an enlarged scale partition cross-sectional view through the filter housing portion of the system taken along line 3—3 of FIG. 2.
Figure 4:
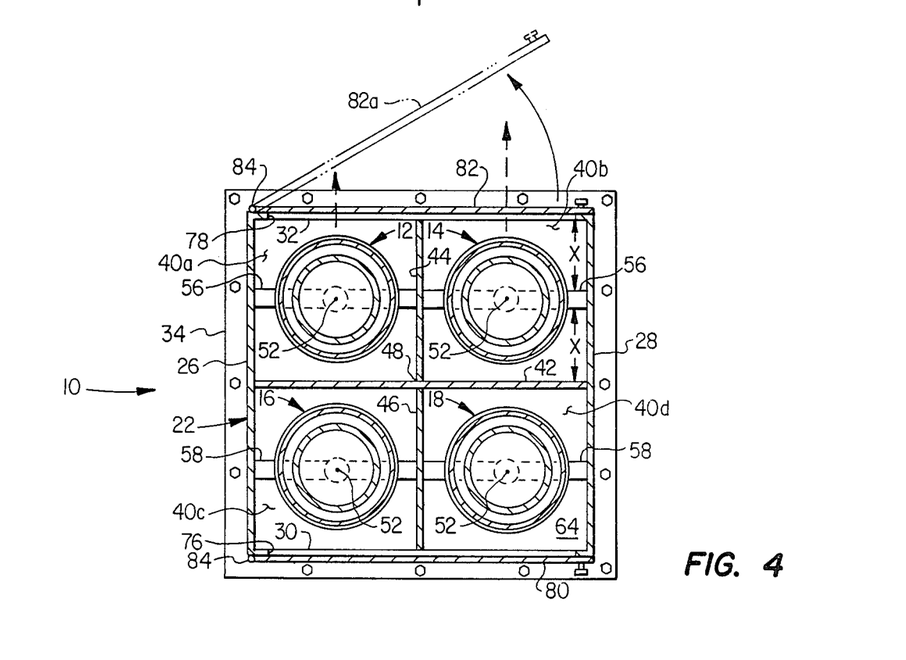
FIG. 4 is an enlarged scale cross-sectional view through the filter housing taken along line 4—4 of FIG. 1.

Referring now to FIGS. 3 and 4, the housing 22 is also provided with a pair of elongated, relatively narrow support trusses 56 and 58 which respectively underlie the lower edges 54 of the structural panels 44 and 46. Support truss 56 extends longitudinally between the housing sidewalls 26 and 28 and is welded at its outer ends thereto, is laterally centered between the rear housing wall 32 and the structural panel 42, and is welded at a central portion thereof to the lower edge 54 of the structural panel 44. Support truss 58 extends longitudinally between the housing sidewalls 26 and 28 and is welded at its outer ends thereto, is laterally centered between the structural panel 42 and the front housing wall 30, and is welded at a central portion thereof to the lower edge 54 of the structural panel 46. As can best be seen in FIG. 4, the support truss 56 is intersected by the vertical axes 52 of the contaminant subchambers $40_a$ and $40_b$, while the support truss 58 is intersected by the vertical axes 52 of the contaminant subchambers $40_c$ and $40_d$. As will be seen, support trusses 56, 58 add further structural rigidity to the housing 22, while at the same time defining a portion of a unique filter mounting system disposed within the housing.

Housing 22 is supported in an elevated position by four support legs 60 (only two of which are visible in FIG. 1) disposed at the lower corners of the housing. The lower housing flange 34 is bolted to a similarly configured flange 62 at the enlarged upper end of a downwardly and inwardly tapering hopper or material receiving section 64 which depends from the housing 22. Hopper 64 is provided at its lower end with an outlet valve device 66 which may be opened to remove particulate matter collected in the hopper during operation of the filtration system. The hopper is also provided, along a sloping side portion thereof, with a suitable inlet pipe 68 for receiving the particulate-laden air flow 20. At the upper end of the housing 22 an outlet opening 70 (FIG. 1) is formed through the housing sidewall 28 above the centerplate 36 to discharge clean, filtered air 72 from the discharge chamber 30 through a suitable vent hood 74 that is disposed over the outlet opening 70 and directs the clean air flow 72 in a generally downward direction along the side of the housing.

To provide access to the contaminant subchambers $40_a$, $40_b$, $40_c$ and $40_d$, suitable openings 76, 78 (FIG. 4) are respectively formed through the front and rear housing sidewalls 30, 32 along the contaminant chamber portion of the housing. The openings 76, 78 are covered by suitable access doors 80, 82 each of which is pivotally connected to the housing by a vertically extending side edge hinge element 84. As can be seen in FIG. 4, outwardly pivoting the access door 82 toward its dotted line position $82_a$ provides complete side access to the contaminant subchambers $40_a$, $40_b$ along substantially their entire heights. In a similar manner, the access door 80 can be pivoted outwardly to provide complete side access to each of the contaminant subchambers $40_c$ and $40_d$ along substantially their entire heights.

Referring now to FIG. 3, the centerplate 36 has formed vertically therethrough four spaced apart circular openings 84 (only one of which is illustrated in FIG. 3), each of such openings 74 being centered about one of the vertical axes 52 of the contaminant subchambers. Coaxially secured within each of the centerplate openings 84 is a vertically extending, hollow cylindrical clean air flow tube 86. A major longitudinal portion $86_a$ of the flow tube projects upwardly into the clean air flow chamber 38, while a much shorter end portion $86_b$ projects downwardly into the contaminant subchamber above which the particular flow tube 86 is disposed.

The filter elements 12, 14, 16 and 18 are of conventional construction and will be described with reference to the representative filter element 18 depicted in FIG. 3. The filter element 18, like the other three filter elements, has an elongated, hollow cylindrical body 88 formed from a suitable porous filter material which may be pleated around its periphery as at 90. In a conventional manner, the filter body 88 may be retained between inner and outer cylindrical metal support grid members (not shown) and defines within the filter a cylindrical internal clean air flow passage 92 which opens outwardly through the opposite ends of the filter body. The upper and lower ends of the filter body are respectively provided with annular metal end caps 94, 96 which coaxially circumscribe the opposite open ends of the internal clean air flow passage 92.

Figure 5:
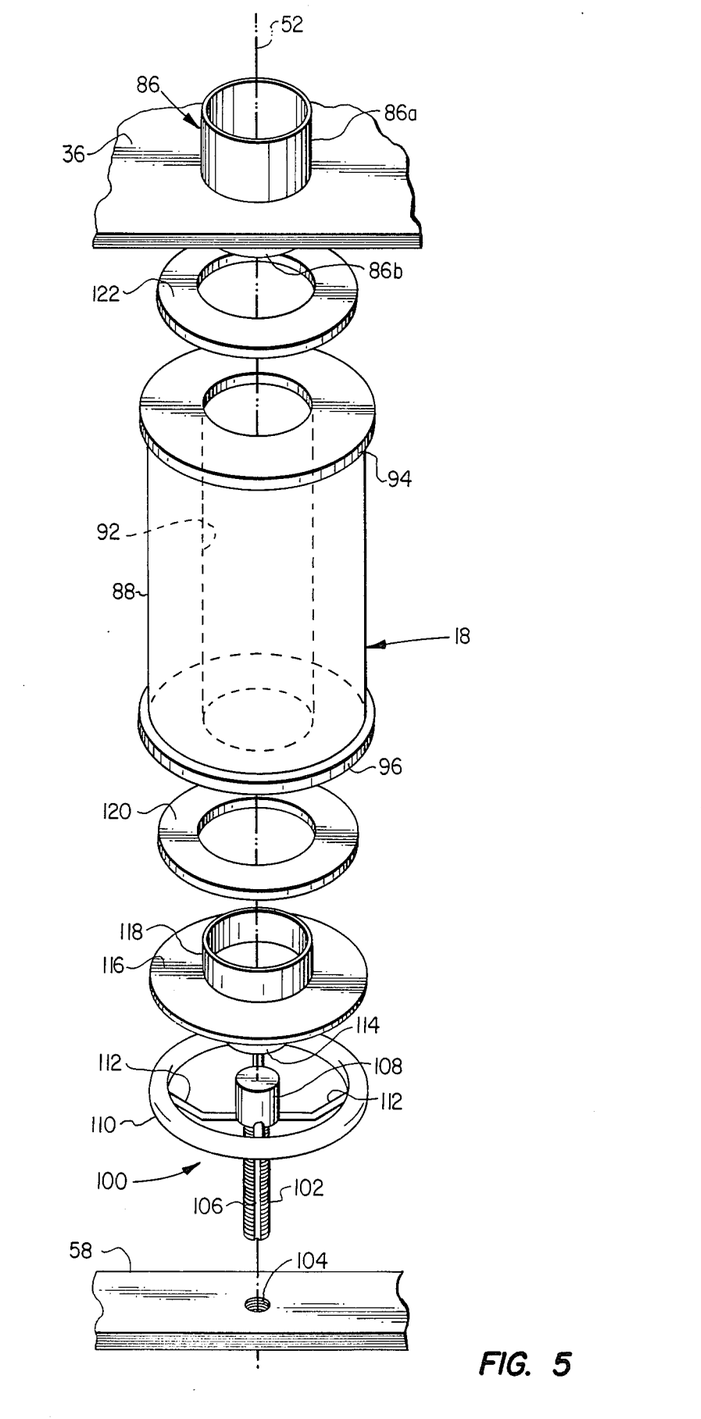
FIG. 5 an exploded perspective view of unique apparatus utilized to mount the filters within the housing.

The four representative filter elements 12, 14, 16 and 18 are coaxially supported within their respective contaminant subchambers, in a vertical orientation, by a unique filter mounting system which will now be described with initial reference to the representative filter element 18 depicted in FIGS. 3 and 5. It will be appreciated that the mounting components and method described in conjunction with the filter element 18 are identical to those used in conjunction with the other three filter elements.

To vertically mount the filter element 18 in its contaminant subchamber 40$_d$, an adjustable lower support member 100 is provided which comprises an externally threaded cylindrical jack screw element 102 that is screwed into an internally threaded opening 104 formed vertically through the support truss 58 and centered upon one of the vertical axes 52. Jack screw 102 has a suitable longitudinally extending thread cleaning slot 106 formed thereon and has an enlarged diameter cylindrical jack head portion 108 formed on an upper end portion thereof. A hand wheel member 110 is coaxially secured to the jack head 108 by a series of radially extending spokes 112. Jack head 108 is coaxially and rotatably received within a hollow cylindrical jack head socket 114 which depends from a circular filter support or gimbal plate 116 that has a filter alignment ring 118 projecting axially upwardly therefrom.

Alignment ring 118 extends upwardly through an annular lower seal element 120 and into a lower end portion of the clean air passage 92 within the filter body 88 through the lower end cap 96. The lower end portion 86$_b$ of the clean air flow tube 86 extends downwardly through the central opening in an upper annular filter seal element 122 and into an upper end portion of the filter body passage 92 through the upper end cap 94.

It can be seen that by rotating the hand wheel 10 in the appropriate direction, the lower support member 100 can be raised within the contaminant subchamber 40$_d$ to compress the lower seal element 120 between the support plate 116 and the lower end cap 96, and to compress the upper seal element 122 between the upper filter end cap 94 and the centerplate 36, to thereby effectively seal both ends of the filter 18.

With the filter element 18 supported in this manner within its contaminant subchamber, the filter element itself is in at least a slight state of axial compression and defines yet another structural member within the housing 22 to further enhance its structural rigidity in a manner subsequently described. It can also be seen that by rotating the hand wheel 110 to lower the support member 100, the filter element 18 can be removed from its end-supporting engagement with the lower flow tube end portion 86$_b$ and the filter alignment ring 118 to permit removal of the filter element from its supporting means.

Referring now to FIGS. 1 and 3, during operation of the depicted air filtration system, the particulate-laden air 20 is forced into the hopper 64 through the inlet pipe 68. Upon entering the hopper 64, at least some of the heavier particulates typically fall directly into the hopper 64. The partially cleansed air flow 20 is then forced upwardly into the contaminant subchambers through the open lower end of the housing 22. Upon vertically entering the contaminant subchambers, the still particulate-laden air 20 is flowed upwardly around the peripheries of the filter elements and then laterally inwardly through the filter bodies 88 into their vertically extending clean air flow passages 92. Such lateral traversal of the filter bodies by the air flow 20 removes most of the remaining particulate matter within the air 20 so that it is substantially particulate free when it enters the interior of the filter bodies. The now substantially clean air 20 is then forced upwardly into the clean air chamber 38 and outwardly through the outlet opening 70, and its associated vent hood 74, in the form of the clean air discharge flow 72.

The filtration apparatus 10 is of a self-cleaning type and is provided with a conventional filter backflushing system 124 (FIGS. 1 and 2) disposed within the clean air chamber 38. Backflushing system 124 includes a flushing reservoir 126 which is supplied with pressurized air from a source thereof (not illustrated). Operatively connected to the flushing reservoir 126 are four flushing valves 128 which are respectively centered over the four clean air flow tubes 86, each of the flushing valves having a downwardly projecting flushing head 130. Access to the backflushing system may conveniently be provided by one or more access panels (not illustrated) positioned on the upper end portion of the housing 22.

To periodically clean or "backflush" the four filter elements, the flushing valves 128 are opened (either simultaneously or in a desired sequence) to force high pressure jets of air 132 downwardly into the filter body interiors through the clean air flow tubes 86. The high pressure air 132 entering the filter bodies is forced laterally outwardly therethrough to dislodge caked-on particulate matter adhering to their lateral peripheries. The dislodged particulates fall downwardly through the contaminant subchambers into the hopper 64. The dislodged particulates may then be dumped from the hopper into a suitable container (not illustrated) by opening the valve element 66.

In addition to the other functions which they perform, it can be seen that the structural panels 42, 44 and 46 also function to prevent particulate cross-contamination between the various filter elements during the backflushing process. More specifically, in the absence of these partition panels, particulate matter laterally dislodged from one of the filter elements during the backflushing process could simply be transferred to the exterior of an adjacent filter element instead of falling downwardly into the hopper as intended. With these partition panels, however, dislodged particulate matter from a given filter cannot come in contact with any portion of an adjacent filter element. Instead, the dislodged particulates are simply driven toward the partition panels and housing walls which define the particular contaminant subchamber and serve to limit the backflush-driven lateral flow of dislodged particulates. The "barrier" walls defined by the partition panels assure that the dislodged particulate matter from one filter element ultimately finds it way into the hopper instead of contaminating another filter element.

During the operation of a conventional filtration system in which multiple filters are simply suspended from the centerplate and are not separated from one another, both the center plate and the filter housing sidewalls must be designed to withstand a substantial degree of lateral flexure caused by variations in internal housing pressure. Such pressure variation, which is particularly acute in the contaminant chamber portion of the housing, is caused by the throughflow of process air which is filtered in the system. The filtration system illustrated herein in a "positive" pressure system in which the particulate-laden air is forced through the housing between the inlet pipe and the clean air discharge opening. However, this same type of pressure variation also occurs in a "negative" pressure filtration system in which the particulate-laden air is drawn through the filter housing. In a positive pressure system, as the filters become clogged, the internal pressure within the contaminant chamber portion of the housng can reach the burst pressure of the filter which can be on the order of 5 psig. This increasing pressure can cause significant laterally outward deflection of both the centerplate and the sidewall section of the contaminant chamber.

Moreover, the centerplate in a conventional filtration is typically exposed to a significant downward deflection load caused by the weight of the filters suspended therefrom and the particulate matter accumulated on the filters, which is supported entirely by the centerplate.

It can be seen that in the present invention both the partition panels and the filter mounting means function in a unique manner to internally brace the contaminant chamber interior portion of the filter housing and the centerplate to thereby significantly enhance the rigidity of the housing, causing three elements to more effectively resist pressure-caused lateral deflection.

More specifically, it can be seen that the present invention provides a structural reinforcing interconnection between and among the centerplate, the partition panels and the lower support trusses. This interconnection functions to substantially enhance the rigidity of the centerplate and the housing sidewalls which, with the centerplate, define the contaminant subchamber portions of the housing. The partition panels interconnected between the lower support trusses and the centerplate serve to divide the relatively large area of the centerplate into four more rigid quadrants-each of which (compared to a non-braced centerplate of the same overall area and thickness) is substantially less susceptible to internal pressure-induced lateral flexure. Both upward and downward centerplate lateral flexure is resisted by the partition panels via their interconnection to the housing sidwall section and the lower support trusses. Further, the partition panels serve to brace the housing sidewalls which define the overall contaminant chamber.

In addition to this structural improvement of the housing, the filter mounting means described above also uniquely function to increase the housing rigidity by uniquely converting each of the mounted filter elements to a structural supporting element within the housing. Stated otherwise, because such filter mounting means interconnect each of the filter elements between the centerplate portion of its particular contaminant subchamber and one of the lower support trusses, each of the mounted filter elements, which is maintained by the filter mounting means in a state of axial compression, defines in part a structural bracing interconnection between the centerplate and one of the lower support trusses.

Additionally, it is important to note that the use of the lower support trusses as a portion of the overall filter mounting means causes the weight of the filters to be borne essentially entirely by the lower support trusses instead of the centerplate. This, of course, advantageously reduces the downwardly directed deflection load on the centerplate.

The lower support truss portion of the filter mounting means provide yet a further advantage which is associated with the lateral loading and unloading of the filter elements through the access doors 80 and 82. It can be seen in FIG. 4 that the lower support trusses 56, 58 function to divide the contaminant subchambers, adjacent their open lower ends, into two elongated rectangular portions having widths "X" that are smaller than the external diameter of the filter elements mounted within these contaminant subchambers. Importantly, the placement of the lower support trusses in this manner prevents the filter elements from being inadvertently dropped into the hopper 64 as they are being loaded or unloaded. Additionally, the gimbal plate 116 and filter alignment ring 118, in a lowered position thereof, provide a convenient base upon which to rest a filter while it is being loaded into its associated contaminant subchamber. With the filter supported in this manner, the hand wheel 110 can simply be rotated to raise the filter until it receives at its upper end the lower portion $86_b$ of the clean air tube 86. Because of the secure interengagement between the jack head 108 and the socket 114, the conventional problem of dropping filter mounting parts into the hopper during loading or unloading of the filters is also substantially eliminated.

According to another desirable feature of the present invention the filter mounting means do not interfere in any manner with the filter backflushing operation. Except for the very minor intrusions into the filter internal passage 92 of the alignment ring 118 and the lower flow tube portion $86_b$ there is no filter-supporting structure disposed within the filter passage 92 which can block or otherwide interfere with or disrupt the flow of backflushing air therethrough.

It can be seen from the foregoing that the present invention provides an air filtration system having filter housing and mounting apparatus which is very substantially improved from a structural and operational standpoint by virtue of the unique cooperation between the partition panels, the lower support trusses and the filter mounting means which advantageously convert the filter elements themselves into structural bracing members. In addition to substantially increasing the overall rigidity of the filter housing, these elements cooperate to greatly facilitate the loading and unloading of the various filter elements in a manner preventing their falling from the contaminant subchambers into the hopper section below.

While the principles of the present invention have been illustrated in conjunction with a filter system having four contaminant subchambers and four associated filter elements, it will be appreciated that a greater or lesser number of filter elements and contaminant subchambers could be used. For example, the illustrated filter housing could be expanded so that each side-accessible row of filter elements could contain more than two filters and associated contaminant subchambers. Similarly, a single row of two or more filters and contaminant subchambers could be utilized. Additionally, if desired, the previously described filter mounting means and lower support truss concept could be utilized in a smaller filter housing designed to accept only a single filter element. Also, if desired, the filter housing could be horizontally disposed, and the filtration system could be of a negative pressure type instead of the positive pressure system representatively illustrated and described.

The foregoing detailed description is to be clearly understood as being given by way of illustration and example only, the spirit and scope of the present invention being limited solely by the appended claims.

What is claimed is:

1. Structurally improved apparatus for use in housing and mounting a filter of generally rigid construction having an internal flow passage extending along and circumscribing an axis, and opening outwardly through opposite ends of the filter, said apparatus comprising:
a housing having:

a wall section defining in part a chamber having an open first end for admitting a flow of particulate-laden gas into said chamber, a transverse wall secured to said wall section and defining a second, opposite end of said chamber, said transverse wall having an opening formed therethrough for discharging filtered gas from said chamber, and a support member extending across said chamber in a spaced relationship with said transverse wall and interconnecting first and second portions of said wall section; and filter mounting means on said transverse wall and said support member for symmetrically engaging the opposite ends of the filter to removably mount the filter in said chamber in a manner such that gas flowed into said chamber through said open first end thereof is forced laterally inwardly through the filter, into its internal flow passage, and then outwardly through said opening in said transverse wall, and the filter is in a state of axial compression and defines a structural bracing interconnection between said transverse wall and said support member to inhibit deflection of said transverse wall into said chamber.

2. The apparatus of claim 1 wherein:

said transverse wall is generally horizontally disposed, said support member is positioned below said transverse wall, and said filter mounting means function in a manner such that said support member bears essentially the entire weight of the filter.

3. The apparatus of claim 1 wherein:

said filter mounting means comprise a clean air flow tube extending through said opening in said transverse wall and having an end portion projecting into said chamber and adapted to be received in a first end portion of the internal flow passage of the filter, and means threadingly secured to said support member and operable to engage an end of the filter adjacent said support member and place the filter in said state of axial compression.

4. The apparatus of claim 3 wherein:

said means threadingly secured to said support member comprise a screw jack member having a first end portion threadingly received in said support member and a second end portion facing said transverse wall, and a gimbal plate having a socked portion adapted to receive said second end portion of said screw jack member and a filter alignment ring portion adapted to be received in a second end portion of the internal flow passage of the filter.

5. The apparatus of claim 4 wherein:

said filter mounting means further comprise a first annular seal member adapted to circumscribe said end portion of said clean air flow tube and be compressed between the filter and said transverse wall, and a second annular seal member adapted to circumscribe said filter alignment ring portion of said gimbal plate and be compressed between said gimbal plate and the filter.

6. The apparatus of claim 1 wherein:

said support member is configured and positioned to preclude passage of the filter through said open first end of said chamber.

7. The apparatus of claim 6 wherein:

said sidewall section is provided with access means for permitting lateral insertion and removal of the filter into and from said chamber.

8. Structurally improved multifilter housing and mounting apparatus for use with a plurality of generally rigid filters of the type having an internal flow passage opening outwardly through opposite ends of the filter, said apparatus comprising:

a housing having:

a sidewall section defining in part a contaminant chamber having an open first end for admitting a flow of particulate-lade gas into said contaminant chamber, a transverse wall secured to said sidewall section and defining a second, opposite end of said contaminant chamber, partition means, intersecured between said sidewall section and said transverse wall, for dividing said contaminant chamber into a plurality of contaminant subchambers extending along axes generally perpendicular to said transverse wall and having open first ends axially spaced from said transverse wall and second ends defined by portions of said transverse wall, a plurality of openings each formed through a different one of said portions of said transverse wall and being generally centered about one of said axes of said contaminant subchambers, and support means for intersecuring laterally opposite wall portions of each contaminant subchamber, said support means being axially spaced from said transverse wall, extending laterally along only a portion of each contaminant subchamber, and being intersected by said axes of said contaminant subchamber; and filter mounting means on said portions of said transverse wall and said support means for engaging the opposite ends of the filters to removably mount the filters in said contaminant subchambers in a manner such that gas flowed into said contaminant subchambers through said open first ends thereof is forced laterally inwardly through the filters, into their internal flow passages, and then outwardly through said openings in said portions of said transverse wall, and the filters are in states of end-to-end compression and define in part structural bracing interconnections between said portions of said transverse wall and said support means to inhibit deflection of said portions of said transverse wall into said contaminant subchambers.

9. The apparatus of claim 8 wherein:

said axes of said contaminant subchambers extend generally vertically, and said filter mounting means are operative to vertically mount the filters within said contaminant subchambers in a manner such that the weight of the filters is borne essentially entirely by said support means.

10. The apparatus of claim 8 wherein:

said support means preclude passage of the filters through said open first ends of said contaminant subchambers.

11. The apparatus of claim 8 wherein:

said housing further has a clean air discharge chamber separated from said contaminant chamber by said transverse wall, and said apparatus further comprises backflushing means, disposed in said clean air discharge chamber, for selectively cleaning filters operatively mounted in said contaminant subchambers.

12. The apparatus of claim 8 wherein:

said partition means comprise a plurality of interconnected partition panels secured along first edge portions thereof to said transverse wall, and secured along second edge portions thereof to said sidewall section.

13. The apparatus of claim 12 wherein:

said support means comprise a plurality of support truss members having portions intersecured between laterally opposite wall portions of said contaminant subchambers, said plurality of openings are defined by a plurality of clean air flow tubes extending perpendicularly through said transverse wall and having end portions projecting into said contaminant subchamber and adapted to be received in first end portions of the filter, and said filter mounting means include said end portions of said clean air flow tubes and means connected to said support truss members for engaging second end portions of the filters and being operable to place the filters in end-to-end compression between said portions of said transverse wall and said support truss members.

14. The apparatus of claim 13 wherein:

said means connected to said support truss member include a plurality of jack screw members threaded into said support truss members and having end portions facing said transverse wall and intersected by said axes of said contaminant subchambers, and a plurality of gimbal plates extending generally parallel to said transverse wall, each of said gimbal plates having on one side thereof a filter alignment ring adapted to be received within said second end portion of one of the filters, and a socket portion disposed on the other side thereof and receiving one of said end portions of said jack screw members.

15. The apparatus of claim 14 wherein:

said jack screw members have handwheels operatively mounted thereon to facilitate manual adjustment thereof toward and away from said portions of said transverse wall.

16. The apparatus of claim 14 further comprising:

a first plurality of annular seal members each adapted to receive one of said end portions of said clean air flow tubes and be compressed between one of said portions of said transverse wall and the first end portion of one of the filters, and a second plurality of annular seal members each adapted to receive one of said filter alignment rings and be compressed between the second end portion of one of the filters and one of said gimbal plates.

17. Air filtration apparatus comprising:

a vertically disposed housing having;

a clean air discharge chamber defined in an upper end portion of said housing and having a clean air outlet opening, a horizontally disposed centerplate defining a lower end of said clean air discharge chamber, a sidewall section secured to and extending downwardly from said centerplate, said sidewall section defining a contaminant chamber disposed beneath said clean air discharge chamber and having an open lower end for receiving a flow of particulate-laden air, partition wall means for dividing said contaminant chamber into a plurality of vertically extending contaminant subchambers centered about vertical axes and having open lower ends, said partition means having an upper end portion secured to said centerplate, a lower end portion, and a horizontally outer portion secured to said sidewall section, support means, spaced downwardly from said centerplate, for intersecuring horizontally spaced wall portions of each of said contaminant subchambers, said support means being intersected by said vertical axes of said contaminant subchambers and horizontally blocking only a portion of said contaminant subchambers;

a plurality of mutually spaced openings formed through said centerplate, each centered about one of said axes of said contaminant subchambers;

access means, associated with said sidewall section, for providing access to said contaminant subchambers in a manner permitting lateral insertion into and removal from each said contaminant subchamber of a vertically disposed, generally rigid hollow cylindrical filter element through said sidewall section; and filter mounting means on said centerplate and said said support means for vertically mounting one of a plurality of hollow cylindrical, generally rigid filters in each of said plurality of contaminant subchambers in a manner such that:

gas flowed into said contaminant subchambers is forced laterally into the interiors of the filters, upwardly through said centerplate openings into said clean air discharge chamber and then outwardly through said clean air discharge opening, the filters each are in a state of end-to-end compression and define in part structural bracing interconnections between said centerplate and said support means within each of said contaminant subchambers, and the weight of the filters is borne essentially entirely by said support means.

18. The apparatus of claim 17 wherein:

said apparatus further comprises a hopper section depending from said housing and communicating with the interiors of said contaminant subchambers, and said support means preclude downward passage of the filters from said contaminant subchambers into said hopper section.

19. The apparatus of claim 17 further comprising:

a plurality of hollow cylindrical filters operatively mounted in said contaminant subchambers.

20. The apparatus of claim 17 wherein:

said filter mounting means include jack screw means threadingly connected to said support means.

21. The apparatus of claim 20 wherein:

said filter mounting means further include gimbal plate means interconnectable between said jack screw means and lower ends of the filters.

22. The apparatus of claim 21 wherein:

said openings formed through said centerplate are defined by clean air flow tubes extending vertically through said centerplate and having lower end portions projecting downwardly into said contaminant subchambers and adapted to be received in upper end portions of the filters, and said filter mounting means further include said lower end portions of said clean air flow tubes.

23. The apparatus of claim 22 further comprising:

seal means compressible between upper ends of the filters and said centerplate, and between lower ends of the filters and said gimbal plate means.

24. The apparatus of claim 17 further comprising:
means for selectively cleaning the filters.

25. The apparatus of claim 24 wherein:
said means for selectively cleaning the filters comprise a filter backflushing system operatively disposed within said clean air discharge chamber

* * * * *